United States Patent [19]
Forte

[11] Patent Number: 5,341,861
[45] Date of Patent: Aug. 30, 1994

[54] VEHICLE SAFETY SUPPORT SYSTEM

[76] Inventor: Robin Forte, 7353 S. Washington Cir., Littleton, Colo. 80122

[21] Appl. No.: 9,065

[22] Filed: Jan. 26, 1993

Related U.S. Application Data

[62] Division of Ser. No. 758,130, Sep. 12, 1991, abandoned.

[51] Int. Cl.$^5$ .............................................. B60C 17/04
[52] U.S. Cl. ..................... 152/158; 152/520
[58] Field of Search ............... 152/520, 516, 157, 158, 152/377; 301/406, 39.1, 40.3, 38.1

[56] References Cited

U.S. PATENT DOCUMENTS

| | | | |
|---|---|---|---|
| 3,435,872 | 4/1969 | Johnson | 152/158 |
| 3,777,797 | 12/1973 | Anderson | 152/158 |
| 4,193,436 | 3/1980 | Cataldo | 152/158 |
| 4,579,160 | 4/1986 | Hardingham | 152/158 |

*Primary Examiner*—Geoffrey L. Knable
*Attorney, Agent, or Firm*—Harold G. Jarcho

[57] ABSTRACT

A vehicle safety support system including a rim having an annular drop center portion straddled by a pair of radially outwardly projecting flange portions each having an annular outer edge of greater diameter than a minimum diameter of the drop center portion; a pneumatic tire mounted on the rim and comprising a pair of annular bead portions, each of the bead portions being sealably seated on a different one of the flange portions, and with the drop center portion of the rim and an inner surface of the tire defining an annular cavity. Also included are a plurality of circumferentially spaced apart elements each comprising an inner portion supported by the drop center portion and an outer portion adapted for movement between an inactive position in which the outer portion does not project into the cavity radially outside the annular edges and an active position in which the outer portion projects into the cavity radially outside the annular edges. In their inactive positions, the elements permit mounting of the tire on the rim and in their active positions, provide support in the event of inadvertent tire deflation.

19 Claims, 2 Drawing Sheets

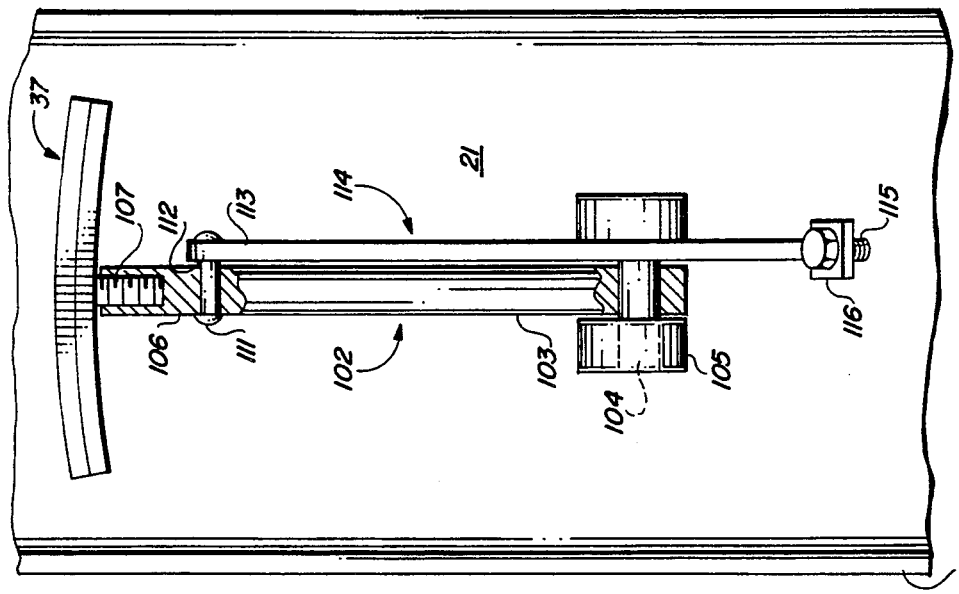
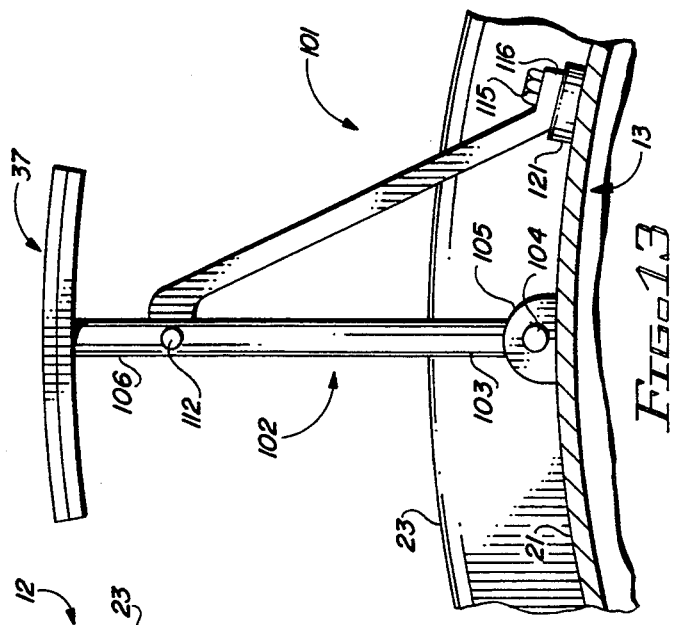
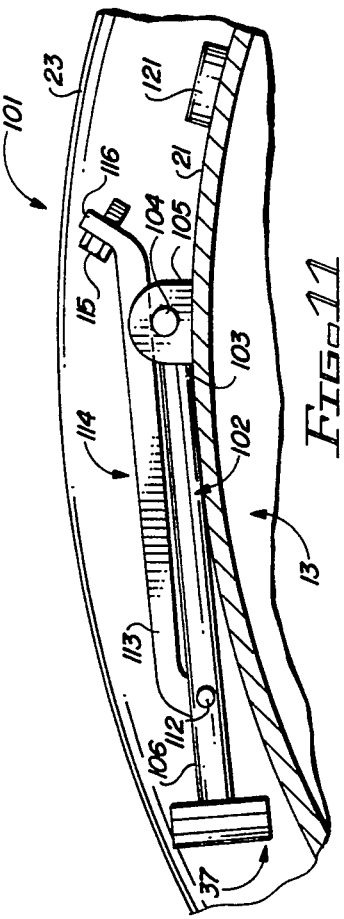
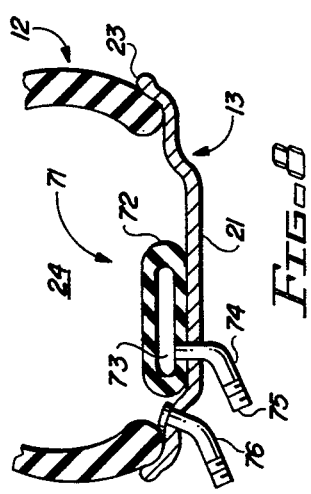
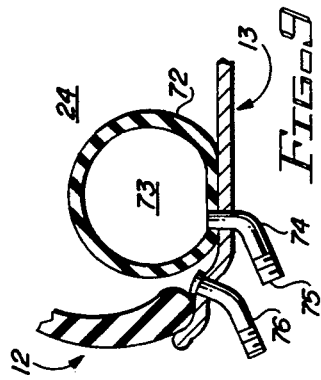

VEHICLE SAFETY SUPPORT SYSTEM

This is a divisional of copending application(s) Ser. No. 07/758,130 filed on Sep. 12, 1991, now abandoned.

BACKGROUND OF THE INVENTION

This invention relates generally to a vehicle safety support system and, more particularly, to a vehicle safety support system employing pneumatic tires as primary components.

Various types of safety devices have been proposed for use with pneumatic tires. Generally their purpose has been to provide vehicle stability in the event of either partial or complete failure of a pneumatic tire for any reason including, for example, underinflation, puncture, overload, etc. Typically, the safety device is designed to provide temporary support of a vehicle until the tire problem can be eliminated. Prior safety devices of this type, however, have suffered from various individual and collective deficiencies including high cost, unreliability, cumbersome assembly requirements, inapplicability to conventional tire mounting systems, etc.

The object of this invention, therefore, is to provide an improved safety system that alleviates problems associated with the use of pneumatic tires.

SUMMARY OF THE INVENTION

The invention is a vehicle safety support system including a rim having an annular drop center portion straddled by a pair of radially outwardly projecting flange portions each having an annular outer edge of greater diameter than a minimum diameter of the drop center portion; a pneumatic tire mounted on the rim and comprising a pair of annular bead portions, each of the bead portions being sealably seated on a different one of the flange portions, and with the drop center portion of the rim and an inner surface of the tire defining an annular cavity. Also included are a plurality of circumferentially spaced apart elements each comprising an inner portion supported by the drop center portion and an outer portion movable between an inactive position in which the outer portion is disposed radially within and between the annular edges and an active position in which the outer portion projects into the cavity radially outside the annular edges. In their inactive positions, the elements permit mounting of the tire on the rim and in their active positions, provide support in the event of inadvertent tire deflation.

According to one feature of the invention, each element further comprises a support extending transversely from the outer portion and the supports together form an at least partial ring within the cavity. The element ring facilitates support of the vehicle after deflation of the tire.

According to another feature of the invention, each support comprises an arcuately shaped surface. The arcuate surfaces provide a support ring that offers smooth vehicle operation after deflation of the tire.

According to yet another feature of the invention, the supports are detachably connected to the outer portions. Detachable supports permit their convenient assembly subsequent to mounting of the elements.

In one embodiment of the invention, the inner portions of the elements threadedly engage and extend through the drop center portions, ends of the inner portions define an actuator portions for engaging a tool adapted to produce rotation of the element and resultant radially outward movement of the outer portion, and an alignment mechanism adapted to align the arcuately shaped surfaces in a circular arrangement when the elements are in their active positions.

According to another embodiment of the invention, the inner portions extend through the drop center portion and the system includes securing means for securing an end of each of the inner portions to the rim when the outer portions are in their active positions.

According to features of the immediately above embodiment, the drop center portion defines a plurality of circumferentially spaced apart openings each receiving one of the elements and retaining seals for establishing pneumatic seals thereto, and each of the elements is tapered and adapted for sliding movement in one of the openings during movement of the outer portion into its active position. Providing tapered elements facilitates their insertion through the pneumatic seals.

According to another embodiment of the invention, the inner portions are pivotally fixed to the drop center portion so as to permit pivotal movement of the outer portions into their active positions.

According to another feature, the above embodiment includes latch arms extending between the outer portions and positions on the drop center portion circumferentially spaced therefrom with the outer portions in their active positions.

The invention also encompasses a vehicle safety support system including a rim having an annular drop center portion straddle by a pair of radially outwardly projecting flange portions; a primary pneumatic tire mounted on the rim and comprising a pair of annular bead portions each sealably seated on a different one of the flange portions and defining with the drop center portion an annular cavity; an auxiliary pneumatic tire mounted on the drop center portion within the cavity and defining an annular volume; a fill tube extending through the drop center portion and having an inner end communicating with the volume; and a valve mounted in the tube. In a deflated condition, the auxiliary tire permits mounting of the primary tire on the rim and, in a subsequent inflated condition provides vehicle support upon inadvertent deflation of the primary tire.

In one embodiment, the auxiliary tire is a hollow pneumatically sealed toroid while, in another embodiment, the drop center portion defines a pair of spaced apart auxiliary flanges disposed between the flange portions, and the auxiliary tire comprises a pair of annular beads each seated on a different one of the auxiliary flanges.

According to one feature of the immediately above embodiments a metal band is molded into the auxiliary tire. The metal band provides stability for the auxiliary tire.

DESCRIPTION OF THE DRAWINGS

These and other objects and features of the invention will become more apparent upon a perusal of the following description taken in conjunction with the accompanying drawings wherein:

FIG. 8 is a cross-sectional view of another safety support system embodiment of the invention with a support element in an inactive position;

FIG. 9 is a cross-sectional view similar to FIG. 8 but with the support element in an active position;

FIG. 11 is a side view of another safety support system embodiment with a support element in an inactive position;

FIG. 12 is a top view of the element shown in FIG. 11; and

FIG. 13 is a side view of the FIG. 11 support element shown in an active position.

DESCRIPTION OF THE PREFERRED EMBODIMENTS

Figure 1:
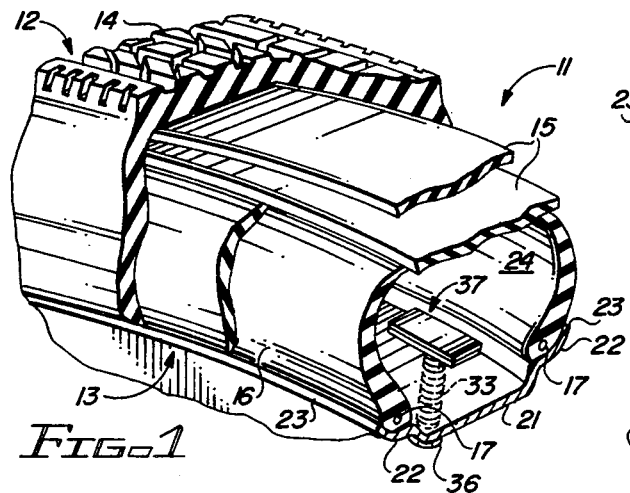
FIG. 1 is a perspective view of a vehicle safety support system according to the invention.

A vehicle safety support system 11 includes a pneumatic tire 12 mounted on an annular rim 13. The tire 12 is conventional and includes an outer tread portion 14, a pair of belts 15, and a pair of bias plies 16 with annular bead portions 17. Straddling a drop center portion 21 of the rim 13 are outwardly projecting symmetrical flange portions 22 that terminate with circular outer edges 23. The diameters of the outer edges 23 are greater than the diameter of the drop center portion 21. Defined by the outer surface of the rim 13 and an inner surface of the tire 12 is an annular cavity 24. The bead portions 17 of the tire 12 are sealably engaged with the flange portions 22 of the rim 13.

Figure 3:
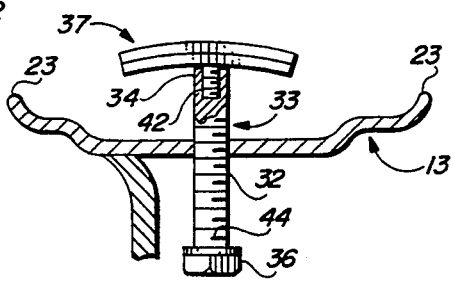
FIG. 3 is a cross-sectional view similar to FIG. 2 but with the operational element in an inactive position.
Figure 4:
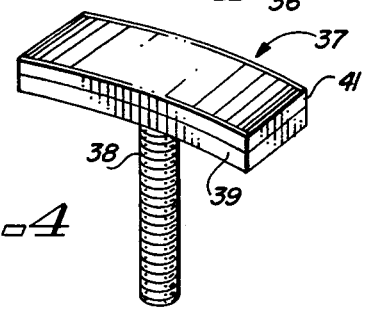
FIG. 4 is a perspective view of a support member shown in FIGS. 1-3.

A plurality of circumferentially spaced apart threaded openings 31 are formed in the drop center portion 21. Extending through each of the openings 31 and threadedly engaged therewith is an externally threaded inner portion 32 of the bolt element 33. An outer portion 34 of each bolt element 33 is disposed within the cavity and is adapted for radially directed movement with respect to the drop center portion 21 between an inactive position (FIG. 3) radially inside the annular edges 23 and an active position (FIG. 2) radially outside the edges 23. Terminating each inner portion 32 is a hexagonally shaped actuator head portion 36 disposed outside the drop center portion 21. A support member 37 is removable engaged with each of the outer portions 34. As shown in FIG. 4, the support member 37 includes a threaded shank portion 38 and an arcuate head portion 39 having a resilient cap 41. Receiving the threaded shank portion 38 of each support member 37 is a threaded axial opening 42 in each of the outer portions 34.

Prior to mounting of the tire 12 on the rim 13, a bolt element 33 is inserted through each opening 31 in the drop center portion 21. A support member 37 is then secured to each of the bolt elements 33 by turning the shank portion 38 into the axial opening 42. At this time, the penetration of the drop center portion 21 by the bolt element 33 is limited so as to position the support member 37 into its inactive position (FIG. 3) radially within the outer edges 23. In that inactive position, the bolt element 33 does not interfere with the subsequent mounting of the tire 12 on the rim 13 in the conventional manner.

Figure 2:
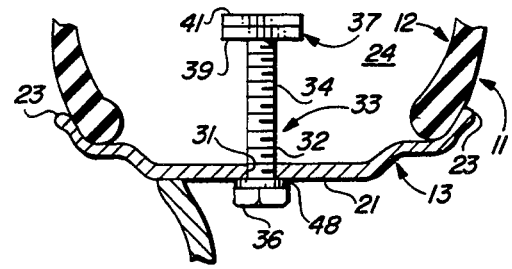
FIG. 2 is a cross-sectional view of the system shown in FIG. 1 and showing an operational element thereof in an active position.
Figure 5:
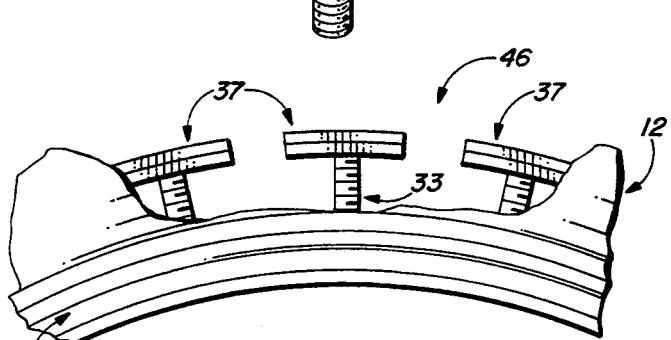
FIG. 5 is a partially cut away side view illustrating a plurality of the operational elements shown in FIGS. 1-4 in active positions.

After mounting of and inflation of the tire 12, a suitable wrench (not shown) is engaged with the actuator heads 36 and utilized to rotate the bolt elements 33 into their active positions shown in FIG. 2. This radial movement of the bolt element 33 is terminated by engagement between the drop center portion 21 and the ends 44 of the external threads on the inner portions 32 of the bolt elements 33. The thread ends 44 are disposed on the bolt elements 33 so as to stop radial movement thereof and corresponding rotational movement of the transversely extending support members 37 such as to position the arcuately shaped caps 41 in alignment with the annular drop center portion 21. In those positions, the support members 37 establish a discontinuous ring 46 within the cavity 24 as shown in FIG. 5. Also, a resilient seal member 48 retained by the inner portion 32 is engaged between the actuator end 36 and the inner surface of the drop center portion 21 to seal the openings 31 therein. In the event of inadvertent deflation of the tire 12, the ring 46 formed by the support members 37 will function to support a vehicle (not shown) on which the system 11 is mounted.

Figure 7:
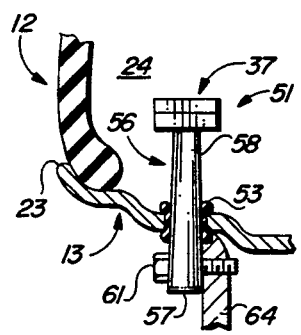
FIG. 7 is a cross-sectional view similar to FIG. 6 but with the operational element in an active position.
Figure 6:
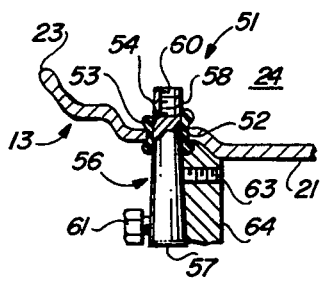
FIG. 6 is a cross-sectional view of another safety support system embodiment and showing an operational element in an inactive position.

FIGS. 6 and 7 illustrate another safety support system embodiment 51 again including a pneumatic tire 12 mounted on a rim 13 to define an annular cavity. Extending through and circumferentially spaced along the drop center portion 21 of the rim 13 are a plurality of openings 52. A resilient seal 53 having a central orifice 54 is retained in each of the openings 52. Extending through each of the orifices 54 is a tapered element 56 having an inner end 57 and an outer end 58. A support element 37 of the type shown in FIG. 4 is removably secured in threaded opening 60 in each of the outer ends 58. Retained by each of the inner ends 57 is a threaded securing bolt 61.

Prior to mounting of the tire 12 on the rim 13, an outer end 58 of a tapered element 56 is inserted through each of the seals 53 to a position outside the edges 23 and a support member 37 is inserted and circumferentially aligned. Next, the element 56 is forced radially inwardly into its inactive position shown in FIG. 6. The tire 12 is then mounted on the rim 13 in the conventional manner. After mounting of the tire 12, the tapered elements 56 are pressed through the seals 53 producing radial movement of the outer ends 58 into active positions shown in FIG. 7 to provide a discontinuous ring as shown in FIG. 5. The bolts 61 then are turned into engagement with threaded openings 63 in a web portion 64 of the rim 13. Upon any inadvertent deflation of the tire 12, the ring 46 formed by the support elements 37 will support a vehicle (not shown) on which the embodiment 51 is mounted.

Illustrated in FIGS. 8 and 9 is another safety support system embodiment 71 again including a primary pneumatic tire 12 mounted on a rim 13 and forming a cavity 24. Retained on the drop center portion 21 of the rim 13 is an auxiliary tire 72 in the form of a hollow pneumatically sealed toroid that defines an annular volume 73. A fill tube 74 having a conventional one way valve 75 extends through the drop center portion 21 and communicates with the annular volume 73. Also extending through the drop center portion 21 and communicating with the cavity 24 is another fill tube 76.

During use of the embodiment 71, the auxiliary pneumatic tire 72 is initially maintained in a deflated inactive condition as shown in FIG. 8. In that condition, the tire 72 is disposed radially within the annular edges 23 and therefore does not interfere with mounting of the tire 12 on the rim 13 in the conventional manner. After mounting and inflation of the primary tire 12, the auxiliary tire 72 is inflated through the fill tube 74 to its active inflated condition as shown in FIG. 9. In its active condition, the auxiliary tire 72 extends radially outwardly into the cavity 24 outside the annular edges 23. Therefore, upon inadvertent deflation of the primary tire 12, the auxiliary tire 72 will function to support a vehicle (not shown) on which the embodiment 71 is mounted.

Figure 10:
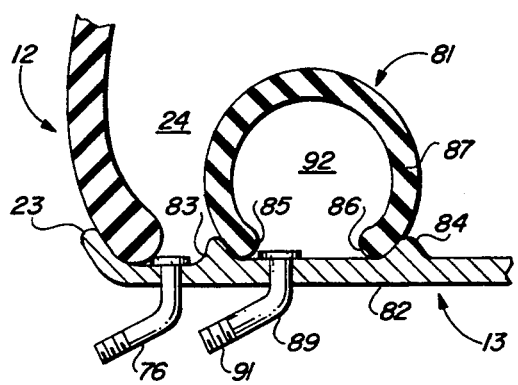
FIG. 10 is a cross-sectional view of another safety support system embodiment of the invention.

Illustrated in FIG. 10 is another safety support system embodiment 81 similar to that shown in FIGS. 8 and 9. Again, a primary pneumatic tire 12 is mounted on a rim 13. In the embodiment 81, however, a drop center portion 82 of the rim 13 defines a pair of annular auxiliary flanges 83, 84. Retained by the flanges 83, 84 are beads 85, 86 of an auxiliary pneumatic tire 87. A fill tube 89 having a one way valve 91 extends through the drop center portion 82 and communicates with an annular volume 92 defined by the auxiliary tire 87. During assembly of embodiment 81, one bead of the primary tire 12 first is mounted on the rim 13 and, after mounting of the auxiliary tire 87, the second bead of the primary tire is mounted.

The embodiment 81 is used similarly to the embodiment 71 shown in FIGS. 8 and 9. After mounting and inflation of the primary tire 12 on the rim 13, the auxiliary pneumatic tire 87 is inflated through the fill tube 89 to an active condition shown in FIG. 10. In its active condition, the auxiliary tire 87 will support a vehicle (not shown) on which the embodiment 81 is mounted in the event of inadvertent deflation of the primary tire 12.

FIGS. 11-13 illustrate another safety system embodiment 101 mounted on a rim 13 for receiving a tire 12. Circumferentially spaced along a drop center portion 21 of the rim are a plurality of support elements 102, only one of which is shown. Each support element 102 includes an inner end 103 pivotally supported by a pin 104 on a base 105 extending outwardly from the drop center portion 21. An outer end 106 of each element 102 has a threaded opening 107 that receives one of the support members 37 shown in FIG. 4. Extending through a hole 111 in the outer end 106 is a pivot portion 112 projecting transversely from one end 113 of a latch arm 114. A bolt 115 is retained in a flange portion 116 on an opposite end of the arm 114.

Before mounting of a tire 12 on the rim 13, each element 102 is pivoted upwardly on the pin 104 and a support member 37 is turned into the opening 107. Each element 102 then is pivoted downwardly into an inactive position shown in FIGS. 11 and 12 with the outer end 106 and the transversely extending support member 37 positioned between and radially inside the rim edges 23. Next, one bead of the tire 12 is mounted on the rim 13 in the conventional manner and each element 102 is pivoted into an active position shown in FIG. 13 with the outer end 106 and the support member 37 disposed radially outside the rim edges 23. Each latch arm 114 then is pivoted in the upper end 106 to align the flange portion 116 with a threaded fixture 121 circumferentially spaced on the drop center portion 21 from the inner end 103 of the element 102. The active positions are secured by turning the bolts 115 into the threaded fixtures 121 and the support members 37 are rotated into circumferentially oriented positions to create a discontinuous ring radially outside the rims edges 23 as shown in FIG. 5. Upon inadvertent deflation of the tire 12, the ring formed by the support members 37 will function to support a vehicle (not shown) on which the embodiment 101 is mounted.

Obviously, many modifications and variations of the present invention are possible in light of the above teachings. It is to be understood, therefore, that the invention can be practiced otherwise than as specifically described.

What is claimed is:

1. A vehicle safety support system comprising:
   a rim having an annular drop center portion straddled by a pair of radially outwardly projecting flange portions, each of said flange portions having an annular edge of greater diameter than a minimum diameter of said drop center portion;
   a pneumatic tire mounted on said rim and comprising a pair of annular bead portions each sealably seated on a different one of said flange portions; and said drop center portion and an inner surface of said tire defining an annular cavity; and
   a plurality of elements circumferentially spaced apart along said drop center portion; each said element comprising an inner portion supported by said drop center portion and an outer portion movable between an inactive position in which said outer portion is disposed radially within and between said annular edges and an active position in which said outer portion projects into said cavity radially outside said annular edges.

2. A vehicle safety support system according to claim 1 wherein each said element further comprises a support means connected to and extending transversely from said outer portion, and with said outer portions in said active positions said support means form an at least partial ring within said cavity for supporting the vehicle after deflation of said tire.

3. A vehicle safety support system according to claim 2 wherein said inner portion of each of said elements threadedly engages and extends through a threaded opening in said drop center portion, and said outer portion moves radially outwardly from said inactive position to said active position.

4. A vehicle safety support system according to claim 3 wherein an end of each of said inner portions defines an actuator portion for engaging a tool adapted to produce rotation of said element and resultant radial movement of said outer portion.

5. A vehicle safety support system according to claim 4 wherein each said support means comprises an arcuately shaped surface.

6. A vehicle safety support system according to claim 5 including alignment means adapted to align said arcuately shaped surfaces in a circular arrangement when the elements are in said active positions.

7. A vehicle safety support system according to claim 10 wherein said alignment means comprises rotational stops on said inner portions.

8. A vehicle safety support system according to claim 4 wherein each said element further comprises a seal means engaged between said actuator portion and said drop center portions with said element in said active positions so as to seal said threaded opening.

9. A vehicle safety support system according to claim 2 wherein each of said support means is detachably connected to said outer portion.

10. A vehicle safety support system according to claim 9 wherein said inner portions extend through said drop center portion and including securing means for securing an end of each of said inner portions to said rim with said outer portion in said active position, and said outer portion moves radially outwardly from said inactive position to said active position.

11. A vehicle safety support system according to claim 10 wherein said drop center portion defines a plurality of circumferentially spaced apart openings each receiving one of said elements and retaining seals for establishing pneumatic seals thereto.

12. A vehicle safety support system according to claim 11 wherein each of said elements is tapered and adapted for sliding movement in one of said openings during movement of said outer portion into said active position.

13. A vehicle safety support system according to claim 2 wherein said support means are spaced apart so as to form said ring as a discontinuous ring.

14. A vehicle safety support system according to claim 2 wherein said inner portions are pivotally fixed to said drop center portion so as to permit pivotal movement of said outer portions into said active positions.

15. A vehicle safety support system according to claim 14 including latch means operable to latch said outer portions into said active positions.

16. A vehicle safety support system according to claim 15 wherein said support means is detachably connected to said outer portion.

17. A vehicle safety support system according to claim 16 wherein each said latch means comprises an arm connected between said outer portion and a position on said drop center portion circumferentially spaced from said inner portion with said outer portion in said active position.

18. A vehicle safety support system according to claim 17 wherein each said arm has one end pivotally connected and an opposite end detachably connected.

19. A vehicle safety support system according to claim 18 wherein said one end is connected to said outer portion and said opposite end is connected to said drop center portion.

* * * * *